US006795941B2

(12) United States Patent
Nickels

(10) Patent No.: US 6,795,941 B2
(45) Date of Patent: Sep. 21, 2004

(54) METHOD FOR DIAGNOSING A NETWORK

(75) Inventor: Robert Alen Nickels, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 550 days.

(21) Appl. No.: 09/746,288

(22) Filed: Dec. 21, 2000

(65) Prior Publication Data

US 2002/0083378 A1 Jun. 27, 2002

(51) Int. Cl.$^7$ .................. G01R 31/28; G06F 15/173
(52) U.S. Cl. .................... 714/706; 709/224
(58) Field of Search ................ 714/2, 4, 706, 714/704, 25; 709/224

(56) References Cited

U.S. PATENT DOCUMENTS

| | | | |
|---|---|---|---|
| 4,462,099 A | 7/1984 | Braun | |
| 4,887,262 A | 12/1989 | van Veldhuizen | |
| 4,947,459 A | 8/1990 | Nelson et al. | |
| 4,979,171 A | 12/1990 | Ashley | |
| 5,001,642 A | 3/1991 | Botzenhardt et al. | |
| 5,157,667 A | 10/1992 | Carusone, Jr. et al. | |
| 5,303,348 A | 4/1994 | Botzenhardt et al. | |
| 5,309,448 A | 5/1994 | Bouloutas et al. | |
| 5,396,357 A | 3/1995 | Goossen et al. | |
| 5,448,561 A | 9/1995 | Kaiser et al. | |
| 5,452,201 A | 9/1995 | Pieronek et al. | |
| 5,469,150 A | 11/1995 | Sitte | |
| 5,483,637 A | 1/1996 | Winokur et al. | |
| 5,551,053 A | 8/1996 | Nadolski et al. | |
| 5,574,848 A | 11/1996 | Thomson | |
| 5,600,706 A | 2/1997 | Dunn et al. | |
| 5,600,782 A | 2/1997 | Thomson | |
| 5,751,964 A * | 5/1998 | Ordanic et al. | 709/224 |
| 5,758,288 A | 5/1998 | Dunn et al. | |
| 6,006,016 A * | 12/1999 | Faigon et al. | 714/56 |
| 6,112,239 A | 8/2000 | Kenner et al. | |
| 6,154,744 A | 11/2000 | Kenner et al. | |
| 6,308,282 B1 | 10/2001 | Huang et al. | |
| 6,414,595 B1 * | 7/2002 | Scrandis et al. | 340/506 |
| 6,421,726 B1 | 7/2002 | Kenner et al. | |
| 6,442,708 B1 * | 8/2002 | Dierauer et al. | 714/25 |

FOREIGN PATENT DOCUMENTS

| | | |
|---|---|---|
| DE | 44 21 307 A1 | 12/1995 |
| DE | 299 08 481 U1 | 7/1999 |
| WO | WO 98/53581 A1 | 11/1998 |
| WO | WO 99/19782 A1 | 4/1999 |
| WO | WO 99/49680 A1 | 9/1999 |
| WO | WO 00/4427 A1 | 1/2000 |

* cited by examiner

Primary Examiner—Albert Decady
Assistant Examiner—Esaw Abraham
(74) Attorney, Agent, or Firm—Snell & Wilmer, LLP

(57) ABSTRACT

The present invention, in one embodiment, is a network having at least one controllable CAN-based sensor device having a microcontroller, a power source and at least one host controller. Preferably, the network is a Smart Distributed System-based network. In this embodiment, each microcontroller communicates with the controller, generating and storing a value in at least one counter when a successful message is transmitted to the controller. When a unsuccessful message is detected by the microcontroller, a counter generates and stores a second or decremental value in the same or different counter. When the sum total value of error messages in the counter reaches a marginal critical value, a message is transmitted to the controller while maintaining the microcontroller's communication with the network. When a counter reaches a critical value, the microcontroller enters a bus off mode and disconnects the sensor device, and thus the microcontroller, from the network.

30 Claims, 2 Drawing Sheets

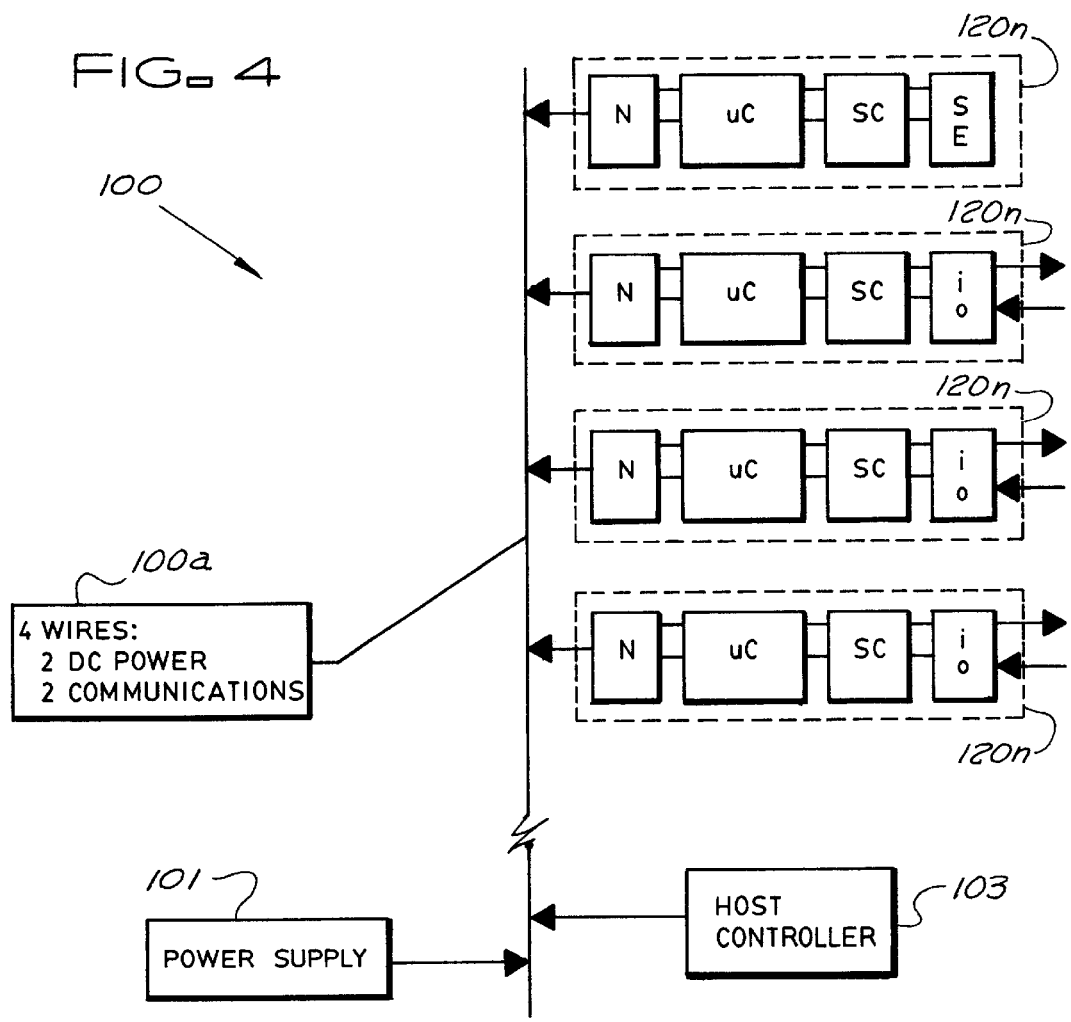
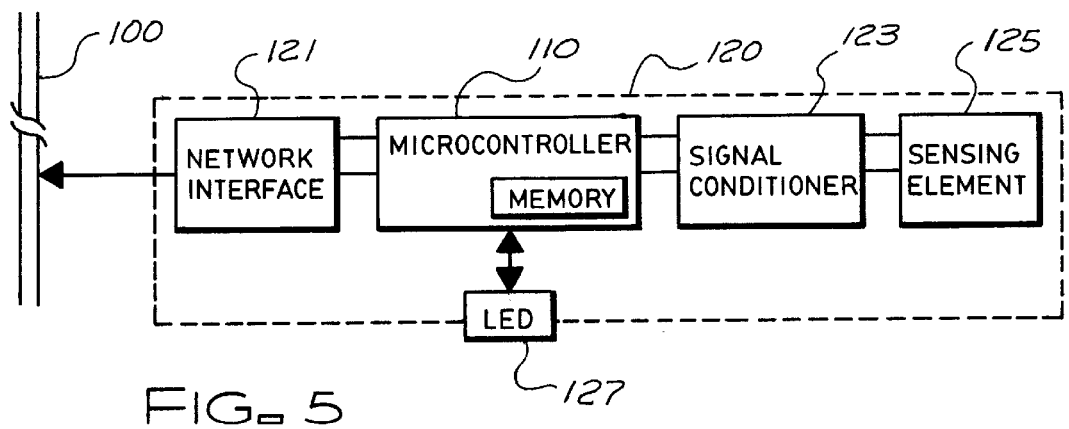

METHOD FOR DIAGNOSING A NETWORK

FIELD OF THE INVENTION

The present invention relates to system control, and more particularly, to methods and systems for diagnosing a network having smart or regulated devices in communication with the network.

BACKGROUND OF THE INVENTION

Smart Distributed System (SDS) is a network technology developed by Honeywell which is a distributed network having interconnected intelligent, regulated and/or controllable devices. Intelligent devices in this context refers to, for example, devices having controllers, microcontrollers or like devices typically with volatile or non-volatile memory retention capabilities. Without limitation, examples of such devices include a sensor means (such as, for example, a photoelectric sensor, electromechanical sensor or a means for controlling an output signal such as a transistor or triactor) adapted to communicate with a system or computer network. While SDS technology has many applications, it was originally designed to simplify network control of automated systems and decrease the complexity of industrial automation. A typical SDS network can include a host controller (such as a controller, microcontroller, processor, computer or like device) in communication with bus structure or architecture, the bus typically comprising a plurality of wires. For example, the bus may comprise a plurality of wires 100a as seen in FIG. 1, two of which are coupled between devices or sensors and two which carry the network communication signals. In turn, each device is able to communicate over the network with other devices coupled to the network and the host controller as required for the process being controlled. While SDS systems are generally accurate, fast and efficient communication between all devices on the SDS network, one of the problems associated with the technology is its limited diagnostic features.

In most controlled processes, one or more sensors are coupled to a controllable apparatus (such as, for example, a material handling conveyor). The type of sensors employed vary depending on the apparatus being controlled, but could include a limit switch, a photoelectric switch or discrete devices. As technology advanced, so has the ability to communicate between the various controlled processes and devices. Thus, while decades ago a sensor could only be controlled to turn off or on (e.g., set/reset, high/low or like state settings), in today's technology, a device can also communicate with other devices to communicate data relating to the device (such as, for example, the device's health, the status of the process being sensed, etc.). Further, sensors such as those employed by the SDS technology are typically in communication with microcontrollers having non-volatile or volatile memory, all housed within the same housing or sensor package. As such, network technologies such as the SDS technology have allowed operators not only to control the sensors but also communicate with or configure the sensors through a network. In this regard, communication of information between sensors and the host controller can include communicating diagnostic information between the sensors and the network because the network is not limited to a single bit or a single wire, and further, because such communication can be of asynchronous or synchronous design. This is an important aspect of network design because an operator should be provided with early indications that a device or sensor is malfunctioning or has the potential to malfunction which may result in system failure and/or injury to humans. In the prior art, when one device or sensor malfunctioned, it was difficult to locate which sensor or device malfunctioned or where a problem originated. Moreover, a malfunctioning sensor or device might affect other sensors or devices in the network, thereby jeopardizing the proper completion of the process being monitored. Early determination of system problems or potential failures will allow the operator to take corrective action as deemed necessary to maintain proper system continuation.

For example, in photoelectric sensor technology, it is known that some photoelectric sensors operate by transmitting a beam of light from a source (usually infrared, polarized or coded) and receiving the beam's reflection. Other such sensors seek reflections from the object being sensed. In any event, all such sensors emit light and seek to receive the emitted light. However, in operation, the lens in such sensors may get dirty or contaminated from a variety of sources, including dust, fingerprints or other debris found in the operating environment. When such sensors fail to detect the transmitted light, the sensors may be programmed to increase the amount of light signal transmitted. However, the power to transmit the light in such sensors can only be increased to a certain level to maintain operation (known as the marginal gain). When the sensor can no longer compensate beyond the marginal gain, the sensing function will likely be lost. The diagnostics built in to the SDS technology handles these situations by allowing the sensor to transmit information over the network to the host controller that it is nearing or at the marginal gain, thereby alerting the operator to take corrective action. However, when the network is down or malfunctioning, such information could not be transmitted to the host controller to notify the operator of the potential problem, thereby making diagnosing the problem difficult. In brief, while diagnostic tools existed at the device (e.g., sensor) level, such diagnostic tools did not exist at the network level.

Controller Area Network (CAN) technology is a technology originally developed to work in the automotive industry, however, it has also found application in other areas. The CAN technology is now found embedded within microcontrollers such as those manufactured by Motorola or Intel. Such CAN-based microcontrollers provide a robust communications capability designed for reliable operation even in environments which may have high levels of potential electrical interference. One of the benefits of the CAN technology is that it reduced the amount of wiring required between controllable devices (such as sensors), which resulted in cost savings. One of the other advantages of the CAN technology is that it incorporates error detection and confinement features into the microcontroller which ensure data integrity at the bit level and at the message level. The main purpose of CAN's error detection function is to survive temporary communications errors which may be caused by spurious external condition, voltage spikes, etc. as well as permanent failures caused by bad connections, faulty cables, defective transmitters or receivers, or long lasting external disturbances.

What is needed is a CAN-based method for diagnosing potential failures on controllable devices within a network. Methods and systems such as those disclosed in the present invention would provide lower initial and recurring costs and further provide greater safety to operators who work with the controlled process or are in the vicinity of the controlled process.

BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

Several embodiments of the present invention are disclosed for one or more methods for diagnosing potential or impending failures on one or more controllable devices within a network. In one embodiment, the present invention is a network having at least one controllable CAN-based sensor device having a microcontroller. Preferably, the network is a SDS-based network. In this embodiment, each microcontroller communicates with the computer, generating and storing a value in at least one counter when a successful message is transmitted to the computer. When a unsuccessful message is detected by the microcontroller, a counter generates and stores a second or decremental value in the counter. When a counter reaches a marginal critical value, a message is transmitted to the computer while maintaining the microcontroller's communication with the network. When a counter reaches a critical value, the microcontroller enters a bus off mode and disconnects the sensor device, and thus the microcontroller, from the network.

In another embodiment, the present invention allows each microcontroller to generate and store power cycle information in at least one counter. The information may include the total cumulative number of power cycles, power cycles since last reset, total power-on time and power on time since last reset. The computer communicating with each microcontroller can obtain this information to generate maintenance or operational alerts or notifications to the network operator.

Another embodiment of the present invention is directed towards those microcontrollers controlling a visual indication means (such as a light emitting diode). The microcontroller is configured to control the LED to generate at least one predetermined blink pattern corresponding to either the network communication health or the attached sensing element's operation.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figure further illustrates the present invention and, together with the detailed description of the invention, serve to explain the principles of the present invention.

FIG. 4 illustrates a CAN-based network according to one aspect of the present invention; and FIG. 5 illustrates a CAN-based device or sensor with a visual indicator according to one aspect of the present invention.

DETAILED DESCRIPTION OF THE INVENTION

Figure 1:
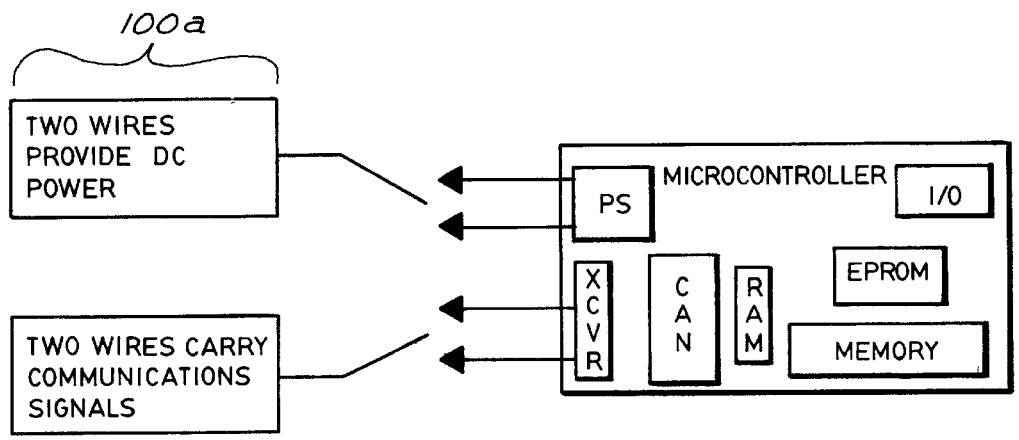
FIG. 1 illustrates a portion of a representative bus system in communication with a microcontroller.

Systems and methods in accordance with various aspects of the present invention provide an improved method for diagnosing potential failures or failures within a network. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, such as memory elements, digital signal processing elements, look-up tables, databases, and the like, which may carry out a variety of functions under the control of one or more microprocessors or other control devices. Such general techniques and components that are known to those skilled in the art are not described in detail herein.

It should further be understood that the exemplary process or processes illustrated may include more or less steps or may be performed in the context of a larger processing scheme. Furthermore, the various flowcharts presented in the drawing figures are not to be construed as limiting the order in which the individual process steps may be performed.

Figure 2:
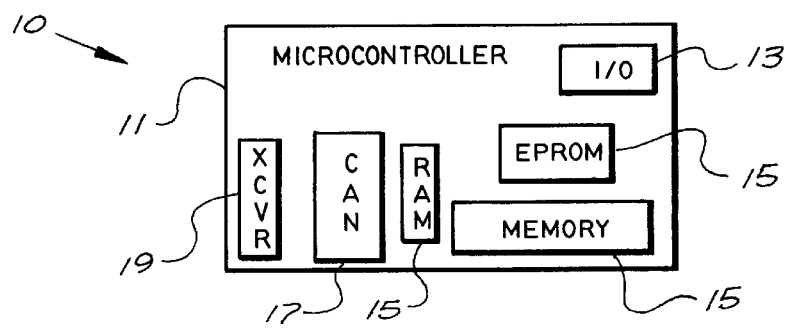
FIG. 2 illustrates a representative CAN-based microcontroller.

As seen in the block diagram of FIG. 2, a conventional CAN-based microcontroller 10 includes a microcontroller 11, input/output interface 13, various volatile and/or non-volatile memory 15, a CAN software core 17 and at least one transceiver 19. CAN core 17 is software which implements the CAN data link layer communication protocol. A Motorola MC6805X4 microcontroller is an exemplary microcontroller as disclosed in this invention. Within the embedded CAN based microcontroller are a plurality of counters (not shown, but which maintain a transmit message and receive message count) and error status registers (not shown) available for programming by an operator when the microcontroller 11 communicates with a network 100.

Figure 3:
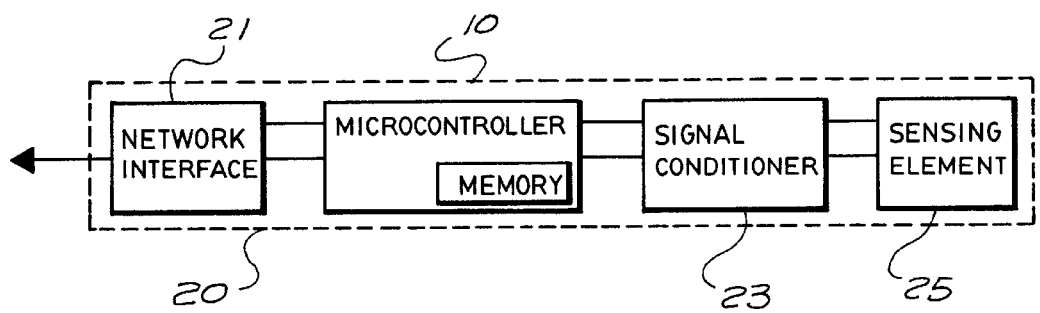
FIG. 3 illustrates a CAN-based device or sensor according to one aspect of the present invention.

The CAN-based microcontroller 10 can be packaged as a single sensing device 20 according to the illustration shown in FIG. 3. As seen in FIG. 3, a CAN-based microcontroller 10 can be coupled to network interface circuitry 21, signal conditioner circuitry 23 and at least one sensing element 25. An exemplary sensing device may be a SDS-SVP-D manufactured by Honeywell.

Thus, for example, in one embodiment of the present invention as seen in FIG. 4, a network 100 is presented which is in communication with at least one controllable CAN-based microcontroller 10 (which is, for example, based on Bosch v 2.0A CAN specification known to those of skill in the art), at least one power source 101 and at least one host computer or controller 103. Preferably, the network 100 is a SDS-based network.

In this embodiment, each microcontroller 120n preferably can communicate with other microcontrollers 120n and the host computer 103 by network 100. Further, each microcontroller 120n can be set to an "error active" mode which allows the microcontroller 120n to communicate with the network 100 and increment a counter whenever a bus error is detected (e.g., a message is not successfully acknowledged by the host). Those of skill in the art will realize that the microcontroller's counter may be the same counter (e.g., increment and decrement its value) or may be implemented by various counters (e.g., one counter increments, another counter decrements, and another counter or logic device generates a sum total value of the incrementing and decrementing counters). Thus, a sensor 120*n* which successfully communicates all messages with a network 100 would have the microcontroller's counter value equal to a sum value of zero.

However, there are times when a sensor may periodically malfunction or not sense the process as instructed or programmed. For example, if the process being controlled vibrates excessively or is under stress, the sensor 120*n* coupled to the process may shake loose, fall off, associated wires may become detached or the power may be temporarily interrupted, thereby preventing accurate sensing. If most of the messages are communicated successfully to the network during these situations, the microcontroller's 120*n* counter will have a lower value corresponding to a lower amount of communication errors with the network. A lower amount of communication errors may be acceptable in some instances depending on the process being controlled. Thus, in some situations, rather than replacing the malfunctioning sensor 120*n*, the sensor may only need to be further secured, coupled to or attached to the process being sensed because the sensor and its corresponding circuitry is still operable yet not fully communicating with the network. Alternatively, a lower value may be indicative of the sensor's 120*n* potential or impending failure. As such, the host controller can maintain a log or an extended examination of any particular sensor's 120*n* health by communicating with each sensor to obtain sum total counter values from each sensor. Depending on the statistical data for each sensor or group of sensors, the operator may desire at this point to replace the sensors. Finally, a higher sum counter value may be indicative of a particular sensor's 120*n* absolute failure. As such, the host controller can maintain a log or an extended examination of any particular sensor's 120*n* health by communicating with each sensor to obtain sum total counter values from each sensor and take action as needed. In this fashion, the operator may wish to simply monitor the sensor producing the error because the error rate is not significant, may decide to proactively replace the sensor 120*n* having a history of communication errors with the network 100 or replace the sensor 120*n* because it simply failed. Thus, early replacement of defective sensors or devices allows for the smooth continued operation of the process being sensed and further, will provide additional safety precautions.

However, if errors continue beyond a first defined count in the counter (e.g., the count meets or exceeds 128 corresponding to 128 errors), the CAN based software controls the microcontroller 120*n* to enter a "passive error" mode which allows the microcontroller 120*n* to continue to communicate with the network 100. The CAN based software further sends a message to the host computer 103 to notify it of the potential error problem with microcontroller 120*n*. If errors still continue beyond a second defined count in the counter (e.g., the count meets or exceeds 256 corresponding to 256 errors), the CAN based software controls microcontroller 120*n* to enter a "bus off" mode, thereby disconnecting the microcontroller 120*n*, and thus the process being controlled, from the network 100. Thus, the sum total internal counter value can provide an indication of the microcontroller's 120*n* health which can be transmitted over the network 100 to a primary network controller (such as another controller or personal computer, for example) for diagnostic analysis or like analysis. Alternatively, diagnostic tests can be performed on each microcontroller 120*n* individually when the communication bus is malfunctioning or without affecting the communication bus.

Therefore, a CAN-based microcontroller 120*n* can be configured to accumulate the number of times the microcontroller reaches a "bus off" state so that long-term trends of the microcontroller 120*n* can be monitored. In this regard, the calculation of each microcontroller's error rate will provide a means of knowing whether a particular microcontroller 120*n* is operating in a stable manner and the severity of communications problems. This new information will be calculated and can be stored in each microcontroller 120*n*, where it can be accessed by a host computer 103 over the network 100, or a warning message can automatically be sent when preset health thresholds are reached. By comparing the relative health of different individual microcontrollers 120*n*, the computer host 103 will be able to identify problem microcontrollers which otherwise would not be known until the frequency of errors and bus-on conditions rose to the level where the application was adversely affected.

Another embodiment of the present invention relates to the number of times each sensor 120*n* is powered on or off (referred to as a power cycle) or the number of times the power to each sensor 120*n* falls below a predetermined threshold. Because each microcontroller 120*n* employed in the present invention preferably includes some form of non-volatile memory, power cycle information (such as the number of times the sensor has been turned on or off) can be counted and stored in each sensor 120*n*. Certain problems in physical wiring such as one or more loose wire connections, intermittent contacts, power supply drop-outs or overcurrent/thermal shutdown and short circuits on the bus will sometimes cause devices 120*n* to execute a power-on initialization process. In this embodiment, the sensor's non-volatile counters can be configured to accumulate the number of power cycles and related information, such as the total cumulative number of power cycles (which preferably is a read-only variable), power cycles since last reset (which preferably can be reset by the user), total power-on time of the device (which preferably is a read-only variable) and power on time since last reset (which preferably can be reset by the user).

Together with a host control program stored on the computer 103, this information enables diagnostic monitoring of the power conditions in each device as a well as for the entire network of devices 120*n*. Problems related to malfunctioning device connections can be isolated to a specific device by allowing the computer 103 to obtain and compare the number of power cycles between each device 120*n* resulting in maintenance information. Thus, for example, the power on time information from a particular device can be used to design preventative maintenance schedules for that device. The host computer 103 can also reset the power cycle counters for each sensor 120*n* at initialization time and thereafter periodically check each device on the network to detect any power related problems without interfering with the on-going control program. Because power-related information can be stored on each device, the computer 103 can periodically and automatically obtain this information from each sensor on the network 100 and notify the operator of any anomalies detected. Those of skill in the art will realize that this aspect of the present invention saves the operator (e.g., network engineer) a great deal of time and resources while assisting in keeping the process continuously running.

Another aspect of the present invention relates to how some existing sensors 120*n* are designed. In some sensor packages, a visual indication means 127 (such as a light emitting diode or LED) is wired to the sensor so that as the sensor senses, the LED is illuminated. These types of sensors are sometimes employed in a network as described previously. In operation, every time a sensor senses, the attached LED will illuminate in one or more pattern sequences (e.g., passing an object in front of a motion sensor causes the LED to illuminate). Thus, an operator may believe that the sensor is properly functioning on the network. However, because the LED is wired directly to the sensor or controlled by the built-in microcontroller (and not controlled by any other component attached to the network 100), there is no way to indicate whether the sensor is properly communicating with the network 100 or the host computer 103. In other words, vital information about a process and/or regulating device(s) in control of an aspect of a regulated process, however, are not generally easily accessible by an operator. Vital process information related to a regulated process, however, includes useful data regarding the condition or state of a controlled process or the sensor. Therefore, one or more problems may arise in a malfunctioning network having a plurality of fully operable sensors.

In this embodiment, a representative microcontroller 110 is programmed to control the visual indicator or LED (as seen in FIG. 5) 127 to generate a particular blink pattern depending on the status of the network communication or the sensing element's operation. Thus, for example, in a SDS network, the host computer 103 may be programmed to send a poll signal to each device on the network 100 periodically (e.g., every 2 to 3 seconds) in order to determine the existence of every component coupled to the network. When microcontroller 110 receives the poll signal, it may be programmed to control visual indicator 127 to continuously generate a first blink pattern which represents that the microcontroller is communicating with the network 100. If the poll signal is interrupted or disengaged, microcontroller 110 may be programmed to control visual indicator 127 to generate a second blink pattern which represents that the microcontroller 110 is not communicating with the network 100. Simultaneously, the microcontroller 110 may also be programmed to control visual indicator 127 to generate a third blink pattern which represents that the sensing element 125 is engaged (e.g., an object moves through the sense field in a motion detector). The microcontroller 110 may also be programmed to control visual indicator 127 to generate a fourth blink pattern which corresponds to a diagnostic error within sensor 110 (such as, for example, a marginal gain error or alignment error). Those of skill in the art will recognize that each of the first, second, third and fourth blink patterns should be discernable and distinct from one another. In this fashion, this embodiment allows an operator to determine whether each sensor or device 120*n* is communicating with the network and/or whether each sensor 120*n* is operational regardless of communicating with the network 100.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a method for diagnosing potential failures on controllable devices within a network, is followed.

The embodiments of an invention in which an exclusive property or right is claimed are defined as follows:

1. A method for diagnosing a network having a computer in communication with at least one controllable CAN-based microcontroller in a sensing device, the method comprising the steps of:

(a) allowing each microcontroller to generate and store network communication errors in at least one counter;

(b) if the counter reaches a marginally critical value in a particular microcontroller, allowing the particular microcontroller to notify the computer, wherein the particular microcontroller continues to communicate with the computer; and (c) if the counter reaches a critical value in a particular microcontroller, allowing the particular microcontroller to notify the computer and disconnect from the network, wherein the particular microcontroller does not continue to communicate with the computer.

2. The method of claim 1, the network being a SDS-based network.

3. The method of claim 2, each counter being integrally formed on the microcontroller.

4. The method of claim 3, the at least one counter further comprising an incremental counter, a decremental counter and a sum value counter.

5. The method of claim 2, the marginally critical value being equal to or less than 128.

6. The method of claim 5, each microcontroller being programmed to enter a passive mode when the marginally critical value is equal to or greater than 128.

7. The method of claim 5, the critical value being equal to or less than 256.

8. The method of claim 7, each microcontroller being programmed to enter a bus off mode when the critical value is equal to or greater than 256.

9. The method of claim 2, each microcontroller storing power cycle information.

10. The method of claim 9, the power cycle information being stored in the at least one counter, the power cycle information further comprising a total cumulative number of power cycles, power cycles since last reset, total power-on time of the device and power on time since last reset.

11. A method for diagnosing a controllable sensor's health within a network, the method comprising the steps of:

(a) operating a network having a computer in communication with at least one controllable sensor, each sensor having a CAN-based microcontroller with at least a first and second counter;

(b) allowing each microcontroller to generate and store network communication errors in the at least first counter;

(c) if the at least first counter reaches a marginally critical value in a particular microcontroller, allowing the particular microcontroller to notify the computer, wherein the particular microcontroller continues to communicate with the computer;

(d) if the at least first counter reaches a critical value in a particular microcontroller, allowing the particular microcontroller to notify the computer and disconnect from the network, wherein the particular microcontroller does not continue to communicate with the computer; and (e) allowing each microcontroller to generate and store power cycle information in the at least second counter.

12. The method of claim 11, the network being a SDS-based network.

13. The method of claim 12, the at least first counter further comprising an incremental counter, a decremental counter and a sum value counter.

14. The method of claim 13, the marginally critical value being equal to or less than 128.

15. The method of claim 14, each microcontroller being programmed to enter a passive mode when the marginally critical value is equal to or greater than 128.

16. The method of claim 14, the critical value being equal to or less than 256.

17. The method of claim 16, each microcontroller being programmed to enter a bus off mode when the critical value is equal to or greater than 256.

18. The method of claim 17, the power cycle information further comprising a total cumulative number of power cycles, power cycles since last reset, total power-on time of the device and power on time since last reset.

19. The method of claim 18, each microcontroller on each sensor further coupled to at least one visual indication means and a sensing element, the method further comprising the steps of allowing the microcontroller to control the visual indication means to generate at least a first blink pattern, a second blink pattern and a third blink pattern.

20. The method of claim 19, the first blink pattern corresponding to the microcontroller's communication with the network.

21. The method of claim 19, the first blink pattern corresponding to the microcontroller's failure to communicate with the network.

22. The method of claim 19, the third blink pattern corresponding to the microcontroller's communication with each sensing element.

23. A method for diagnosing potential or impending failures on one or more controllable devices in a network, the method comprising the steps of:
   (a) operating a network having a host controller in communication with at least one controllable sensor, each sensor having a CAN-based microcontroller with a counter, each microcontroller further coupled to at least one visual indication means and a sensing element;
   (b) allowing each microcontroller to generate and store network communication errors in the counter;
   (c) if the counter reaches a marginally critical value in a particular microcontroller, allowing the particular microcontroller to notify the controller, wherein the particular microcontroller continues to communicate with the controller;
   (d) if the counter reaches a critical value in a particular microcontroller, allowing the particular microcontroller to notify the controller and disconnect from the network, wherein the particular microcontroller does not continue to communicate with the controller;
   (e) allowing each microcontroller to generate and store power cycle information in the at least second counter; and
   (f) allowing the microcontroller to control the visual indication means to generate a blink pattern corresponding to the microcontroller's communication with the network and operation of the corresponding sensing element.

24. The method of claim 23, the network being a SDS-based network.

25. The method of claim 24, the counter further comprising an incremental counter, a decremental counter and a sum value counter.

26. The method of claim 25, the marginally critical value being equal to or less than 128.

27. The method of claim 26, each microcontroller being programmed to enter a passive mode when the marginally critical value is equal to or greater than 128.

28. The method of claim 26, the critical value being equal to or less than 256.

29. The method of claim 28, each microcontroller being programmed to enter a bus off mode when the critical value is equal to or greater than 256.

30. The method of claim 29, the power cycle information further comprising a total cumulative number of power cycles, power cycles since last reset, total power-on time of the device and power on time since last reset.

* * * * *